US008693073B2

(12) United States Patent
Kuan et al.

(10) Patent No.: US 8,693,073 B2
(45) Date of Patent: Apr. 8, 2014

(54) DOCUMENT IMAGE READING APPARATUS

(75) Inventors: Chien-Kuo Kuan, Taipei (TW);
Yung-Tai Pan, Taipei (TW)

(73) Assignee: Primax Electronics Ltd., Taipei (TW)

( * ) Notice: Subject to any disclaimer, the term of this patent is extended or adjusted under 35 U.S.C. 154(b) by 50 days.

(21) Appl. No.: 13/586,546

(22) Filed: Aug. 15, 2012

(65) Prior Publication Data
US 2013/0329267 A1 Dec. 12, 2013

(30) Foreign Application Priority Data

Jun. 8, 2012 (TW) .............................. 101120655 A

(51) Int. Cl.
*H04N 1/04* (2006.01)
*G03F 3/08* (2006.01)
(52) U.S. Cl.
USPC ............ 358/498; 358/518; 358/474; 358/475
(58) Field of Classification Search
USPC .................................. 358/498, 518, 474, 475
See application file for complete search history.

(56) References Cited

U.S. PATENT DOCUMENTS

| 4,737,857 | A  | * | 4/1988  | Rucci et al.  | 358/412 |
|-----------|----|---|---------|---------------|---------|
| 5,978,102 | A  | * | 11/1999 | Matsuda       | 358/474 |
| 8,503,045 | B2 | * | 8/2013  | Kubo et al.   | 358/474 |
| 8,559,071 | B2 | * | 10/2013 | Kawata        | 358/474 |
| 2011/0267661 | A1 | * | 11/2011 | Hayes et al. | 358/474 |
| 2011/0299136 | A1 | * | 12/2011 | Kubo et al.  | 358/474 |
| 2012/0314263 | A1 | * | 12/2012 | Kawata       | 358/474 |
| 2012/0320434 | A1 | * | 12/2012 | Takeda       | 358/475 |
| 2012/0320437 | A1 | * | 12/2012 | Kanaya       | 358/518 |

* cited by examiner

*Primary Examiner* — Charlotte M Baker
*Assistant Examiner* — Rudy Grisham
(74) *Attorney, Agent, or Firm* — Kirton McConkie; Evan R. Witt

(57) ABSTRACT

A document image reading apparatus includes a sheet input tray, a sheet output tray, a sheet transfer channel, an image pickup device, a sheet pick-up module, and a transfer roller assembly. The sheet output tray is disposed under the sheet input tray, or the sheet output tray is disposed over the sheet input tray. After each of the plural documents on the sheet input tray is shot by the image pickup device, the document is fed into the sheet transfer channel by the sheet pick-up module. Then, the document is transmitted to the sheet output tray by the transfer roller assembly.

12 Claims, 5 Drawing Sheets

DOCUMENT IMAGE READING APPARATUS

FIELD OF THE INVENTION

The present invention relates to a shooting-type image reading apparatus, and more particularly to a document image reading apparatus with an automatic document feeding function.

BACKGROUND OF THE INVENTION

Scanning apparatuses are widely used for scanning images of paper documents. Consequently, the contents of the paper documents can be converted into electronic files. The electronic files may be further spread, managed or stored by the user. Conventionally, the scanning apparatus may acquire the complete image of the document by linearly scanning the document. That is, when the document is driven to be transferred through an immobile scanning module at a constant speed, a scanning operation is performed on the document. Alternatively, for performing the scanning operation, the scanning module is moved from an end of the document to the other end of the document at a constant speed while the document is kept immobile. The above scanning approaches are well known to those skilled in the art, and are not redundantly described herein.

The conventional scanning apparatus, however, has some drawbacks. For example, if the user wants to acquire a complete image of a document, it takes a time period of waiting for the document to be completely transferred through the scanning module or waiting for the scanning document to be completely transferred through the document. Since this time period is relatively long, the scanning efficiency of the conventional scanning apparatus fails to meet the requirements of the modern societies. Moreover, the image quality acquired by the conventional scanning apparatus is dependent on the transmitting speed of the document or the moving speed of the scanning module. If the transmitting speed of the document or the moving speed of the scanning module is not kept constant, the acquired resultant image may be discontinuous. In other words, it is difficult to control the conventional scanning apparatus.

For solving these drawbacks, a document image reading apparatus has been disclosed in for example U.S. Pat. No. 5,805,272. FIG. 1 is a schematic partial front view illustrating a conventional document image reading apparatus disclosed in U.S. Pat. No. 5,805,272. In the document image reading apparatus 1, an image pickup device 11 is disposed over a document table 12. The complete image of an inside page of a book 3 placed on the document table 12 may be directly acquired by the image pickup device 11 in an area scanning manner. The way of acquiring the image by the image pickup device 11 in the area scanning manner is similar to the way of acquiring the image by the conventional camera.

Moreover, a sheet transfer channel 13 is disposed under the document table 12. Each of the single documents P1 placed on a sheet output tray 14 may be fed into the sheet transfer channel 13, and then transmitted to a document image reading section 15 at the middle of the document table 12. Consequently, the image of the document P1 is shot by the image pickup device 11. However, since the area of the document image reading section 15 is very small, only a portion of the image of the document P1 is acquired at each shooting time. For acquiring the complete image of the document P1, the document P1 should be shot at multiple times during the process of moving the document P1.

From the above discussions, if the user wants to use the document image reading apparatus 1 to read the complete image of a single document at a shooting time, the document needs to be manually placed on the document table 12 in order to be shot by the image pickup device 11. However, if a great number of documents need to be read, the documents should be sequentially and manually placed on the document table 12 in order to be shot by the image pickup device 11. In other words, the document image reading apparatus 1 is not user-friendly. Moreover, if the document image reading apparatus 1 is employed and the automatic document feeding function of the document image reading apparatus 1 is enabled to acquire the images of all documents, the drawbacks from the manual operation may be eliminated. However, the time period required to read the image of each document is increased.

From the above discussions, the conventional scanning apparatus needs to be further improved.

SUMMARY OF THE INVENTION

The present invention relates to a document image reading apparatus, and more particularly to a document image reading apparatus with an automatic document feeding function.

In accordance with an aspect of the present invention, there is provided a document image reading apparatus. The document image reading apparatus includes a casing, a sheet input tray, a sheet output tray, a sheet transfer channel, an image pickup device, a sheet pick-up module, and a transfer roller assembly. Plural documents are placed on the sheet input tray. The sheet transfer channel is arranged between the sheet input tray and the sheet output tray. The image pickup device is used for shooting each of the plural documents on the sheet input tray. After each of the plural documents is shot by the image pickup device, the document is fed from the sheet input tray into the sheet transfer channel by the sheet pick-up module. Each of the plural documents within the sheet transfer channel is transmitted to the sheet output tray by the transfer roller assembly. The sheet output tray is disposed under the sheet input tray, or the sheet output tray is disposed over the sheet input tray.

In an embodiment, the sheet pick-up module includes a sheet pick-up arm and a sheet pick-up roller. The sheet pick-up roller is located at a first end of the sheet pick-up arm. Each of the plural documents on the sheet input tray is fed into the sheet transfer channel by the sheet pick-up roller.

In an embodiment, the sheet pick-up module further includes a shaft. The shaft is penetrated through a second end of the sheet pick-up arm for driving the sheet pick-up arm and the sheet pick-up roller to be departed from a shooting range of the image pickup device.

In an embodiment, the sheet pick-up module further includes a sheet separation roller and a sheet separation pad for providing a friction force to the plural documents, so that only one document is allowed to be fed into the sheet transfer channel by the sheet pick-up module.

In an embodiment, the document image reading apparatus further includes an elastic element. The elastic element is disposed under the sheet input tray for providing an elastic force to the sheet input tray.

In an embodiment, the document image reading apparatus further includes a supporting frame. The image pickup device is disposed on the supporting frame, so that a shooting angle is defined between the image pickup device and the plural documents.

In an embodiment, the supporting frame is pivotally coupled to the casing. When the document image reading apparatus is in a stored mode, the supporting frame is parallel with the casing.

In an embodiment, the document image reading apparatus further includes a transparent pressing plate. The transparent pressing plate is disposed over the sheet input tray for pressing an uppermost document of the plural documents.

In an embodiment, the transparent pressing plate is made of a transparent plastic material.

In an embodiment, the transparent pressing plate is made of polycarbonate (PC), polymethylmethacrylate (PMMA) or glass.

In an embodiment, the transparent pressing plate is a movable transparent pressing plate.

In an embodiment, the document image reading apparatus further includes a position-limiting structure. The position-limiting structure is disposed on the sheet input tray for preventing the plural documents from being slid relative to the sheet input tray.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
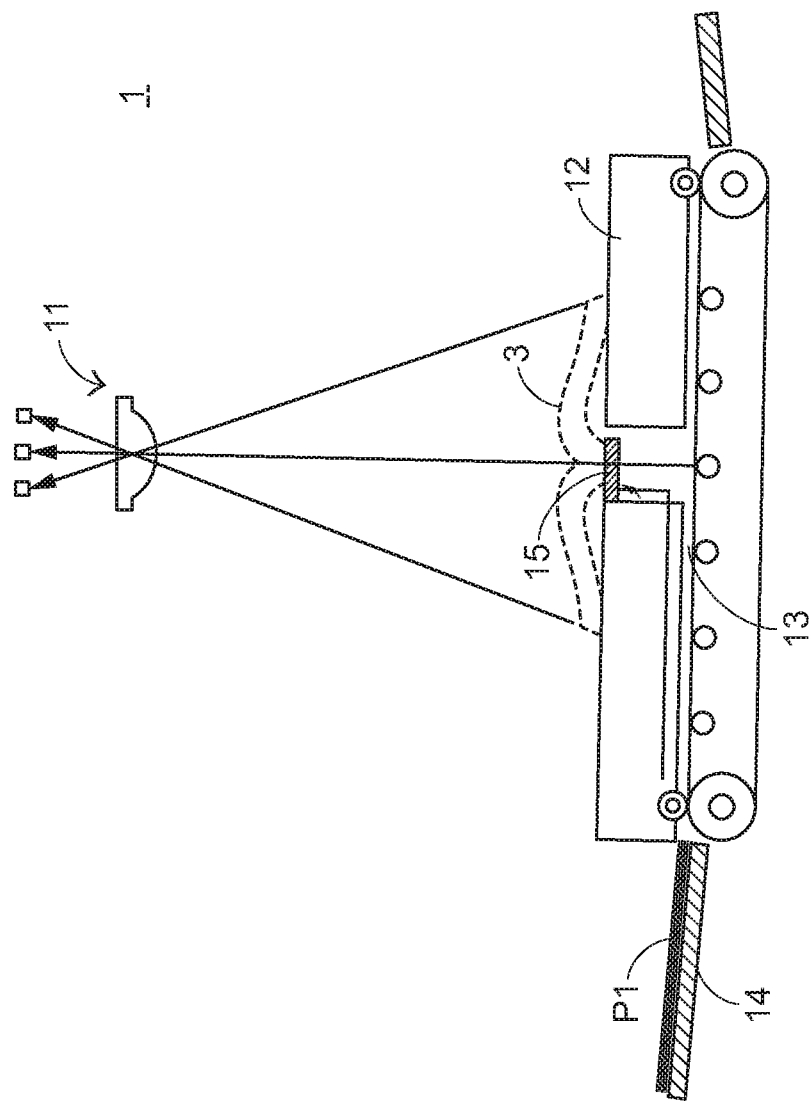
FIG. 1 is a schematic partial front view illustrating a conventional document image reading apparatus.
Figure 2:
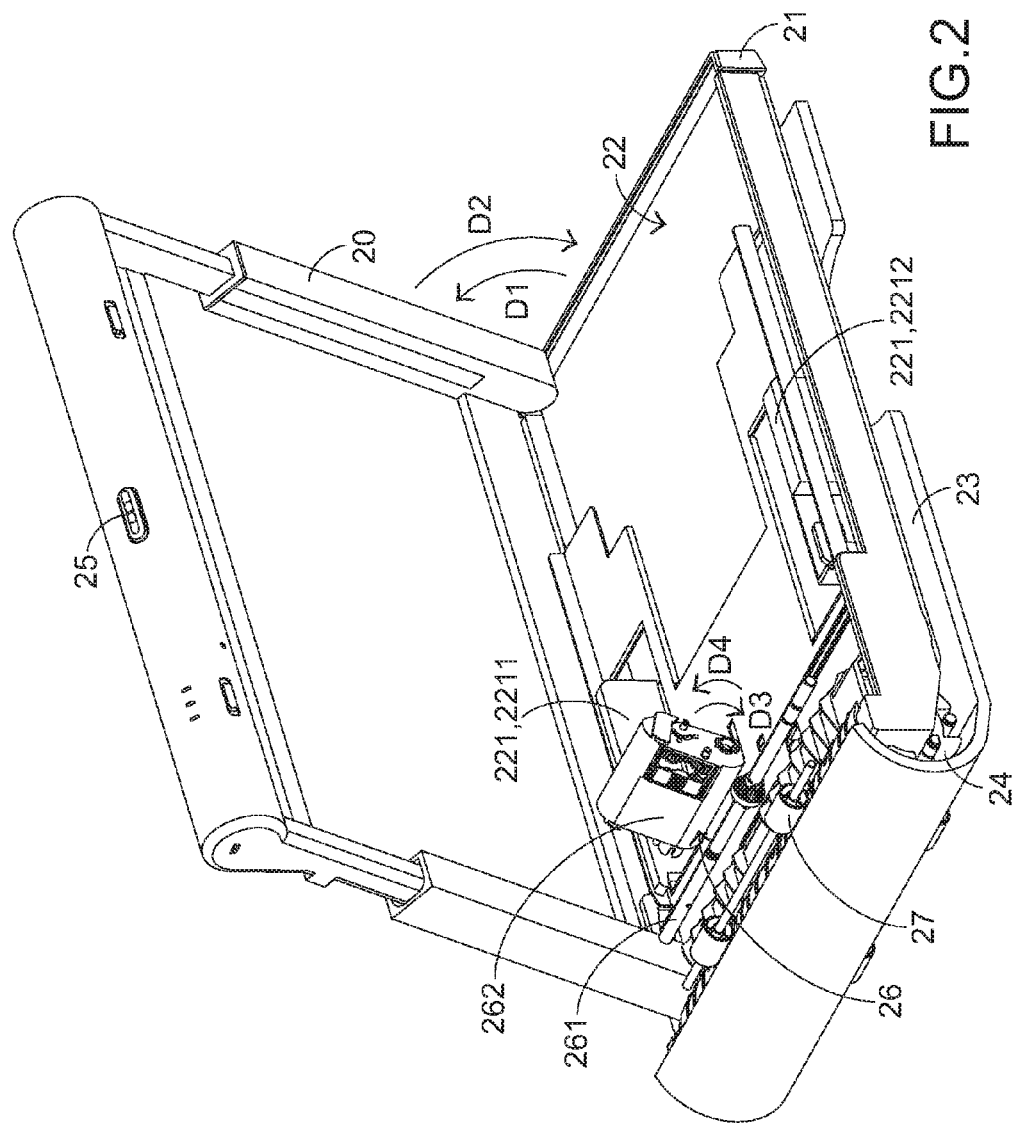
FIG. 2 is a schematic partial perspective view illustrating a document image reading apparatus according to a first embodiment of the present invention.
Figure 3:
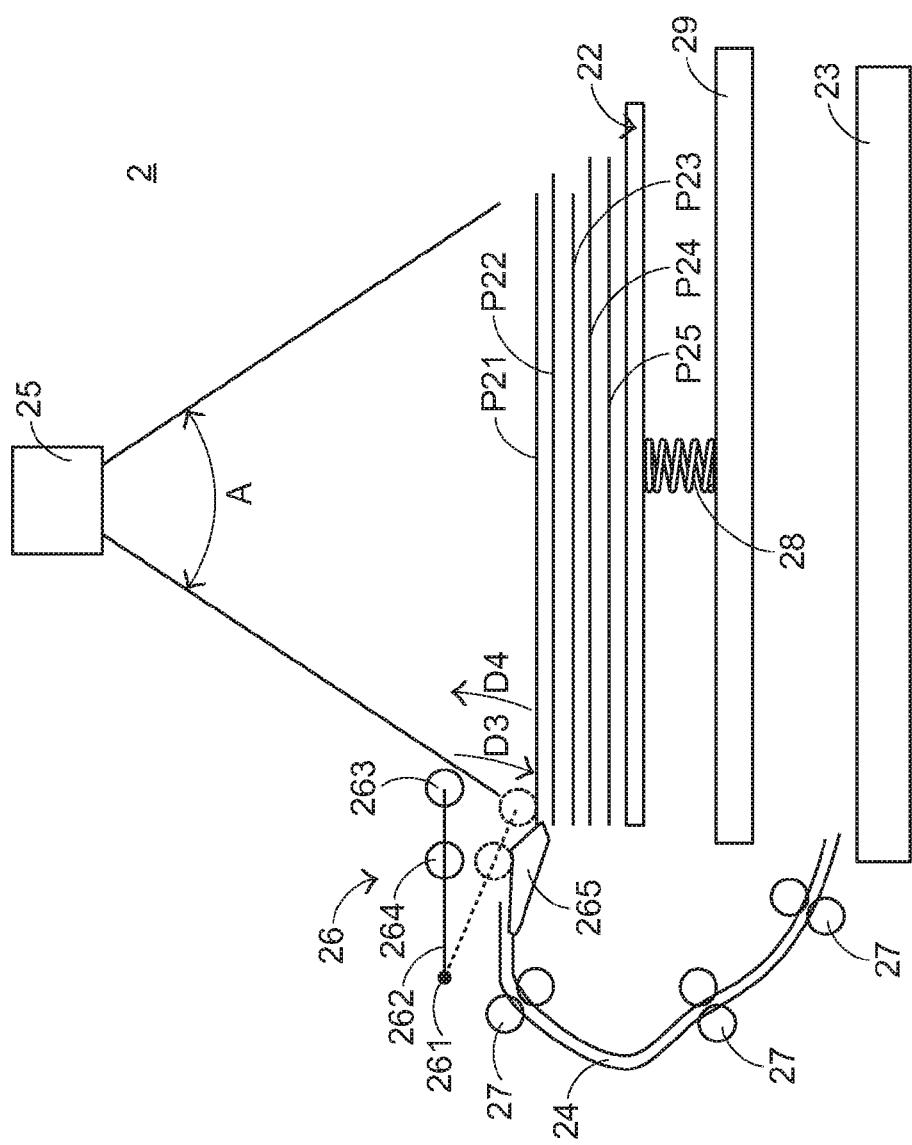
FIG. 3 schematically the operations of the document image reading apparatus of FIG. 2.

FIG. 2 is a schematic partial perspective view illustrating a document image reading apparatus according to a first embodiment of the present invention. FIG. 3 schematically the operations of the document image reading apparatus of FIG. 2. As shown in FIGS. 2 and 3, the document image reading apparatus 2 comprises a casing 21, a sheet input tray 22, a sheet output tray 23, a sheet transfer channel 24, an image pickup device 25, a sheet pick-up module 26, a transfer roller assembly 27, an elastic element 28, and a fixing plate 29. The sheet output tray 23 is disposed under the sheet input tray 22. The sheet transfer channel 24 is in communication with the sheet input tray 22 and the sheet output tray 23, and arranged between the sheet input tray 22 and the sheet output tray 23. The sheet pick-up module 26 is located beside the sheet input tray 22. By the sheet pick-up module 26, plural documents P21~P25 placed on the sheet input tray 22 may be sequentially fed into the sheet transfer channel 24. After one of the documents is fed into the sheet transfer channel 24, the document is transmitted to the sheet output tray 23 by the transfer roller assembly 27 and supported on the sheet output tray 23.

Moreover, the fixing plate 29 is disposed within the casing 21 and located over the sheet output tray 23. The elastic element 28 is arranged between the sheet input tray 22 and the fixing plate 29 for providing an elastic force to the sheet input tray 22 from bottom to top. It is noted that the elastic element 28 and the fixing plate 29 are not essential components of the document image reading apparatus 2 of the present invention.

Moreover, the image pickup device 25 is disposed over the sheet input tray 22 for shooting the plural documents P21~P25 on the sheet input tray 22, thereby acquiring the complete images of these documents P21~P25. In this embodiment, the document image reading apparatus 2 further comprises a supporting frame 20. The image pickup device 25 is disposed on the supporting frame 20. Preferably, the supporting frame 20 is an inverted U-shaped frame with two retractable lateral parts. In addition, the image pickup device 25 is located at a top end of the supporting frame 20. The two lateral parts of the supporting frame 20 are pivotally coupled to the casing 21. By properly adjusting the included angle between the supporting frame 20 and the casing 21, for example by moving the supporting frame 20 in the direction D1 or in the direction D2, an optimal shooting angle between the image pickup device 25 and the plural documents P21~P25 on the sheet input tray 22 can be obtained. In a case that the document image reading apparatus 2 is in a non-usage status, the supporting frame 20 may be moved in the direction D2 until the supporting frame 20 is parallel with the casing 21. Under this circumstance, the document image reading apparatus 2 is in a stored mode in order to reduce the occupied space of the document image reading apparatus 2. The location of the document image reading apparatus 2, the structure of the supporting frame 20 and the way of connecting the supporting frame 20 and the casing 21 are presented herein for purpose of illustration and description only. However, those skilled in the art will readily observe that numerous modifications and alterations may be made while retaining the teachings of the invention.

Furthermore, the sheet pick-up module 26 comprises a shaft 261, a sheet pick-up arm 262, and a sheet pick-up roller 263. The sheet pick-up roller 263 is located at a first end of the sheet pick-up arm 262. The shaft 261 is located at a second end of the sheet pick-up arm 262 and penetrated through the sheet pick-up arm 262. For picking up the documents by the sheet pick-up module 26, the shaft 261 is rotated in response to a diving force exerted on the shaft 261. Upon rotation of the shaft 261, the sheet pick-up arm 262 is correspondingly rotated in the direction D3 until the sheet pick-up roller 263 is contacted with the uppermost document P21 on the sheet input tray 22 (see the dotted line as shown in FIG. 2). Consequently, the document P21 may be fed into the sheet transfer channel 24. For shooting the documents by the image pickup device 25, the shaft 261 is rotated in response to another driving force. Upon rotation of the shaft 261, the sheet pick-up arm 262 is correspondingly rotated in the direction D4. Consequently, the sheet pick-up arm 262 and the sheet pick-up roller 263 are departed from the shooting range A of the image pickup device 25.

In this embodiment, the sheet pick-up module 26 further comprises a sheet separation roller 264 and a sheet separation pad 265. During the document P21 is fed into the sheet transfer channel 24 by the sheet pick-up roller 263, the sheet separation roller 264 and the sheet separation pad 265 may provide a friction force to the document P21, so that only one document is allowed to be fed into the sheet transfer channel 24 by the sheet pick-up module 26 at each time. The friction forces between the document P21, the sheet separation pad 265 and the sheet separation roller 264 should be elaborately controlled. It is preferred that the friction force U3 between the document and the sheet separation roller 264 is greater than the friction force U1 between the document and the sheet separation pad 265, and the friction force U1 is greater than the friction force U2 between the documents (i.e. U3>U1>U2).

In this embodiment, the document image reading apparatus 2 further comprises a position-limiting structure 221. The position-limiting structure 221 is disposed on the sheet input tray 22. Moreover, the position-limiting structure 221 comprises a first guiding and position-limiting part 2211 and a second guiding and position-limiting part 2212. The first guiding and position-limiting part 2211 and the second guiding and position-limiting part 2212 are movable in the direction close to or far from each other in order to clamp both sides of the documents P21~P25. Since the documents P21~P25 are confined between the first guiding and position-limiting part 2211 and the second guiding and position-limiting part 2212, the possibility of sliding the documents P21~P25 relative to the sheet input tray 22 will be minimized or eliminated. The operating principles of the position-limiting structure 221 are well known to those skilled in the art, and are not redundantly described herein.

Hereinafter, the operations of the document image reading apparatus 2 will be described in more details. Firstly, the plural documents P21~P25 to be scanned are placed on the sheet input tray 22. Then, the uppermost document P21 of the to-be-scanned plural documents P21~P25 is shot by the image pickup device 25, so that a complete image of the uppermost document P21 is acquired. After the uppermost document P21 has been scanned, the sheet pick-up module 26 is moved again to be contacted with the scanned document P21, so that the scanned document P21 is fed into the sheet transfer channel 24. Then, the scanned document P21 is transmitted to the sheet output tray 23 by the transfer roller assembly 27. In such way, the scanning operation on the single document P21 is completed.

Moreover, after the scanned document P21 is fed into the sheet transfer channel 24, the sheet pick-up module 26 is moved to a region departed from the shooting range A of the image pickup device 25. Moreover, in response to the elastic force provided by the elastic element 28, a next document P22 is moved upwardly. The next document P22 is processed by the above process of processing the document P21. Consequently, the image of the next document P22 is acquired, and the next document P22 is outputted to and supported on the sheet output tray 23. In such way, the documents P21~P25 on the sheet input tray 22 can be sequentially scanned by the document image reading apparatus 2.

Figure 4:
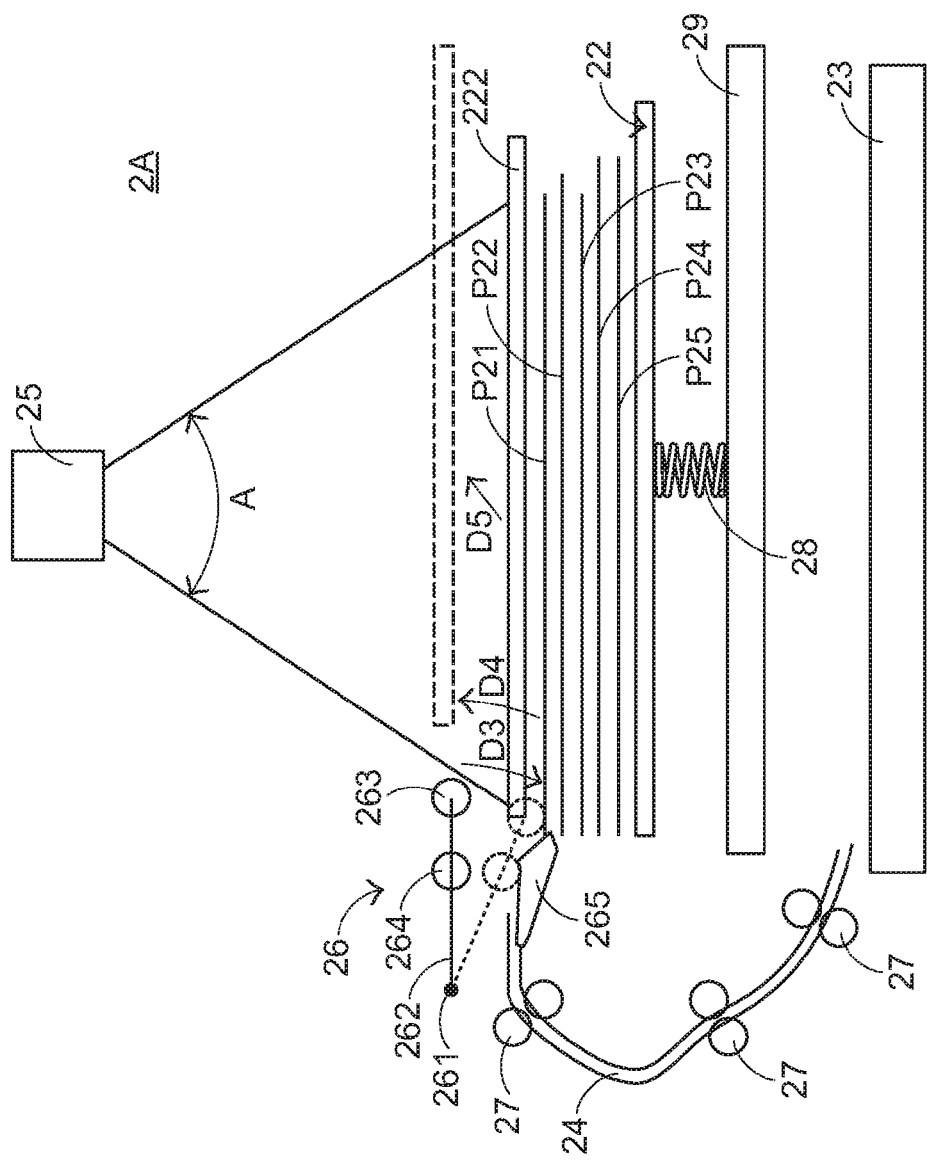
FIG. 4 is a schematic partial view illustrating a document image reading apparatus according to a second embodiment of the present invention.

FIG. 4 is a schematic partial view illustrating a document image reading apparatus according to a second embodiment of the present invention. Except for the following items, the configurations of the document image reading apparatus 2A are similar to those of the first embodiment, and are not redundantly described herein.

In comparison with the first embodiment, the document image reading apparatus 2A of this embodiment further comprises a transparent pressing plate 222. The transparent pressing plate 222 is arranged between the image pickup device 25 and the plural to-be-scanned documents P21~P25. The transparent pressing plate 222 is used for pressing the uppermost document P21 of the plural to-be-scanned documents P21~P25. Preferably, the transparent pressing plate 222 is made of a transparent plastic material. An example of the transparent plastic material includes but is not limited to polycarbonate (PC), polymethylmethacrylate (PMMA) or glass.

Figure 5:
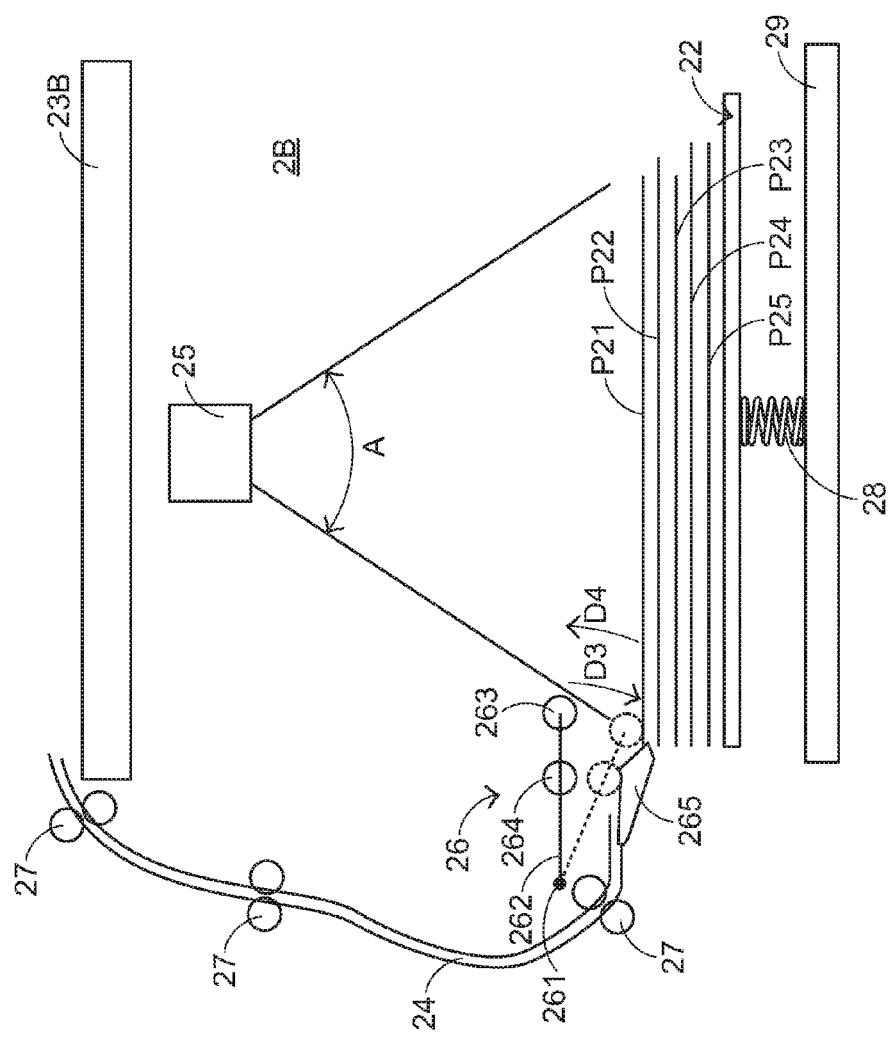
FIG. 5 is a schematic partial view illustrating a document image reading apparatus according to a third embodiment of the present invention.

Moreover, for allowing the scanned document to be contacted with the sheet pick-up roller 263 and fed into the sheet transfer channel 24 by the sheet pick-up roller 263, the transparent pressing plate 222 should be moved in the direction D5 by at least a specified distance (see the dotted line as shown in FIG. 4). The way of moving the transparent pressing plate 222 may be implemented by a manual moving approach. Alternatively, according to a special design, the transparent pressing plate 222 may be electrically to an actuator (not shown). Due to the actuator, the way of moving the transparent pressing plate 222 may be implemented by an automatic moving approach FIG. 5 is a schematic partial view illustrating a document image reading apparatus according to a third embodiment of the present invention. Except for the following items, the configurations of the document image reading apparatus 2B are similar to those of the first embodiment, and are not redundantly described herein.

In comparison with the first embodiment, the sheet output tray 23B of the document image reading apparatus 2B of this embodiment is disposed over the sheet input tray 22 and the image pickup device 25. After the images of the plural documents P21~P25 on the sheet input tray 22 are captured by the image pickup device 25, the plural documents P21~P25 are upwardly transmitted to and place on the sheet output tray 23B.

From the above description, the plural documents on the sheet output tray can be automatically and sequentially scanned by the document image reading apparatus of the present invention at a fast speed. As previously, the conventional sheet-feeding type scanning apparatus has many drawbacks such as the deteriorated scanning efficiency and the stringent sheet-transferring speed, and the conventional document image reading apparatus lacking for the automatic document feeding function is labor-intensive and troublesome. The use of the document image reading apparatus of the present invention can effectively solve the above drawbacks. Since the sheet input tray of the document image reading apparatus of the present invention is disposed over or under the sheet output tray, the planar layout area of the document image reading apparatus is reduced, and the space utilization of the document image reading apparatus is more flexible.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A document image reading apparatus, comprising:
a casing;
a sheet input tray, wherein plural documents are placed on said sheet input tray;
a sheet output tray;
a sheet transfer channel arranged between said sheet input tray and said sheet output tray;
an image pickup device for shooting each of said plural documents on said sheet input tray;
a sheet pick-up module, wherein after each of said plural documents is shot by said image pickup device, said document is fed from said sheet input tray into said sheet transfer channel by said sheet pick-up module; and a transfer roller assembly, wherein each of said plural documents within said sheet transfer channel is transmitted to said sheet output tray by said transfer roller assembly, wherein said sheet output tray is disposed under said sheet input tray, or said sheet output tray is disposed over said sheet input tray.

2. The document image reading apparatus according to claim 1, wherein said sheet pick-up module comprises:
a sheet pick-up arm; and
a sheet pick-up roller located at a first end of said sheet pick-up arm, wherein each of said plural documents on said sheet input tray is fed into said sheet transfer channel by said sheet pick-up roller.

3. The document image reading apparatus according to claim 2, wherein said sheet pick-up module further comprises a shaft, wherein said shaft is penetrated through a second end of said sheet pick-up arm for driving said sheet pick-up arm and said sheet pick-up roller to be departed from a shooting range of said image pickup device.

4. The document image reading apparatus according to claim 1, wherein said sheet pick-up module further comprises a sheet separation roller and a sheet separation pad for providing a friction force to said plural documents, so that only one document is allowed to be fed into said sheet transfer channel by said sheet pick-up module.

5. The document image reading apparatus according to claim 1, further comprising an elastic element, wherein said elastic element is disposed under said sheet input tray for providing an elastic force to said sheet input tray.

6. The document image reading apparatus according to claim 1, further comprising a supporting frame, wherein said image pickup device is disposed on said supporting frame, so that a shooting angle is defined between said image pickup device and said plural documents.

7. The document image reading apparatus according to claim 6, wherein said supporting frame is pivotally coupled to said casing, wherein when said document image reading apparatus is in a stored mode, said supporting frame is parallel with said casing.

8. The document image reading apparatus according to claim 1, further comprising a transparent pressing plate, wherein said transparent pressing plate is disposed over said sheet input tray for pressing an uppermost document of said plural documents.

9. The document image reading apparatus according to claim 8, wherein said transparent pressing plate is made of a transparent plastic material.

10. The document image reading apparatus according to claim 9, wherein said transparent pressing plate is made of polycarbonate (PC), polymethylmethacrylate (PMMA) or glass.

11. The document image reading apparatus according to claim 8, wherein said transparent pressing plate is a movable transparent pressing plate.

12. The document image reading apparatus according to claim 1, further comprising a position-limiting structure, wherein said position-limiting structure is disposed on said sheet input tray for preventing said plural documents from being slid relative to said sheet input tray.

* * * * *